US006287103B1

(12) United States Patent
Miyazaki

(10) Patent No.: US 6,287,103 B1
(45) Date of Patent: Sep. 11, 2001

(54) DIE FOR MANUFACTURING HONEYCOMB BODIES

(75) Inventor: Makoto Miyazaki, Nagoya (JP)

(73) Assignee: NGK Insulators, Ltd. (JP)

( * ) Notice: Subject to any disclaimer, the term of this patent is extended or adjusted under 35 U.S.C. 154(b) by 0 days.

(21) Appl. No.: 09/429,631

(22) Filed: Oct. 29, 1999

(30) Foreign Application Priority Data

Oct. 29, 1998 (JP) ........................................ 10-308802

(51) Int. Cl.[7] ........................................ B29C 47/12

(52) U.S. Cl. ................ 425/131.1; 425/464; 264/177.12

(58) Field of Search .................... 264/177.12; 425/461, 425/131.1, 464

(56) References Cited

U.S. PATENT DOCUMENTS 4,298,328 * 11/1981 Frost .............................. 425/376 A
4,349,329 * 9/1982 Naito et al. ........................ 425/461
4,381,912 * 5/1983 Yamamoto et al. ................ 425/461
4,384,841 * 5/1983 Yamamoto et al. ................ 425/461
5,089,203 * 2/1992 Kragle ........................... 264/177.11
5,256,054 * 10/1993 Cocchetto et al. ................ 425/462

* cited by examiner

*Primary Examiner*—Nam Nguyen
*Assistant Examiner*—Joseph S Del Sole
(74) *Attorney, Agent, or Firm*—Parkhurst & Wendel, L.L.P.

(57) ABSTRACT

A die for manufacturing honeycomb bodies includes; a die main body having batch supply holes which are opened to a backside surface of the die, slit channels which are communicated with the batch supply holes and are opened to a foreside surface of the die and a taper worked portion which is formed by working an outer peripheral portion of the foreside surface of the die in a taper manner; and a control plate arranged at a portion opposed to the taper worked portion. In the die having the construction mentioned above, slit channel expanding portions are formed at open ends of the slit channels existing in the taper worked portion in such a manner that the slit channel is expanded gradually toward the open end.

5 Claims, 4 Drawing Sheets

DIE FOR MANUFACTURING HONEYCOMB BODIES

BACKGROUND OF THE INVENTION

1. Field of the Invention

The present invention relates to a die for manufacturing honeycomb bodies used for extruding honeycomb structural bodies.

2. Description of Related Art

Generally, various kinds of dies for manufacturing honeycomb bodies are known, having; a die main body including batch supply holes which are opened to a backside surface of the die, slit channels which communicate with the batch supply holes open to a foreside surface of the die, and a chamfered conical-like surface or taper worked portion formed by working an outer peripheral portion of the foreside surface of the die in a taper manner; and a control plate arranged at a portion opposed to the taper worked portion.

FIG. 4 is a schematic view showing one embodiment of a known die for manufacturing honeycomb bodies. In the embodiment shown in FIG. 4, a die 51 for manufacturing honeycomb bodies comprises a die main body 52 and a control plate 53. The die main body 52 has a disk-shape and comprises batch supply holes 61 which are opened to its backside surface (lower surface (not shown) in FIG. 4) and slit channels 62 which are opened to its foreside surface (upper surface in FIG. 4). The slit channels 62 have a crisscross shape at the foreside surface of the die main body 52, and the batch supply holes 61 are communicated with alternate intersection points. An outer peripheral portion of the die main body 52 is worked into a taper shape to form a taper worked portion 63. The control plate 53 is connected to the die main body 52 via a spacer 64 in such a manner that one surface 53*a* is opposed (parallel in FIG. 4) to the taper worked portion 63.

In the die 51 for manufacturing honeycomb bodies having the construction shown in FIG. 4, a ceramic batch for example is supplied from the batch supply holes 61 which are opened to the backside surface of the die 51, and the thus supplied ceramic batch is extruded from the slit channels 62 which are opened to the foreside surface of the die 51, so as to obtain a honeycomb structural body. Then, it is possible to reduce an inward batch stress when an outer wall is formed and to prevent a collapsing of outer cells i.e. a generation of wrinkle portions in the honeycomb structural body by forming the taper worked portion 63 at the outer peripheral portion of the die main body 52 and by arranging the control plate 53 at a portion opposed to the taper worked portion 63. However, if a thin wall honeycomb structural body having a thin rib thickness, which is required recently, is to be formed, an isostatic strength of the honeycomb structural body become smaller correspondingly since the rib thickness is thin. Therefore, at the outer portion of the honeycomb structural body to which a pressure is liable to be applied, ribs are deformed and wrinkle portions are liable to be generated. As a result, the honeycomb structural bodies thus obtained are liable to be inferior goods.

SUMMARY OF THE INVENTION

An object of the invention is to eliminate the drawbacks mentioned above and to provide a die for manufacturing honeycomb bodies in which rib strength can be improved and prevent generation fatally defective of wrinkle portions at an outer portion of a thin honeycomb body.

According to the invention, a die for manufacturing honeycomb bodies including; a die main body having batch supply holes which are opened to a backside surface of the die, slit channels which communicate with the batch supply holes and open to a foreside surface of the die, and a chamfered conical-like surface or taper worked portion formed by working an outer peripheral portion of the foreside surface of the die in a taper manner; and a control plate arranged at a portion opposed to the taper worked portion, comprises slit channel expanding portions formed at open ends of the slit channels existing in the taper worked portion to gradually expand the slit channel toward the open end.

In the present invention, since the slit channel expanding portions having the construction mentioned above are arranged at a predetermined portion of the slit channels existing in the taper worked portion of the outer peripheral portions, a larger amount of batch can be supplied to the slit channel expanding portions as compared with that of the other portion, and thus the outermost ribs of the honeycomb structural body can be strengthened. Therefore, an isostatic strength of the honeycomb structural body can be improved even if the honeycomb structural body has a thin wall, and it is possible to prevent a generation of wrinkle portions at the outer portion.

DESCRIPTION OF THE PREFERRED EMBODIMENT

Figure 1:
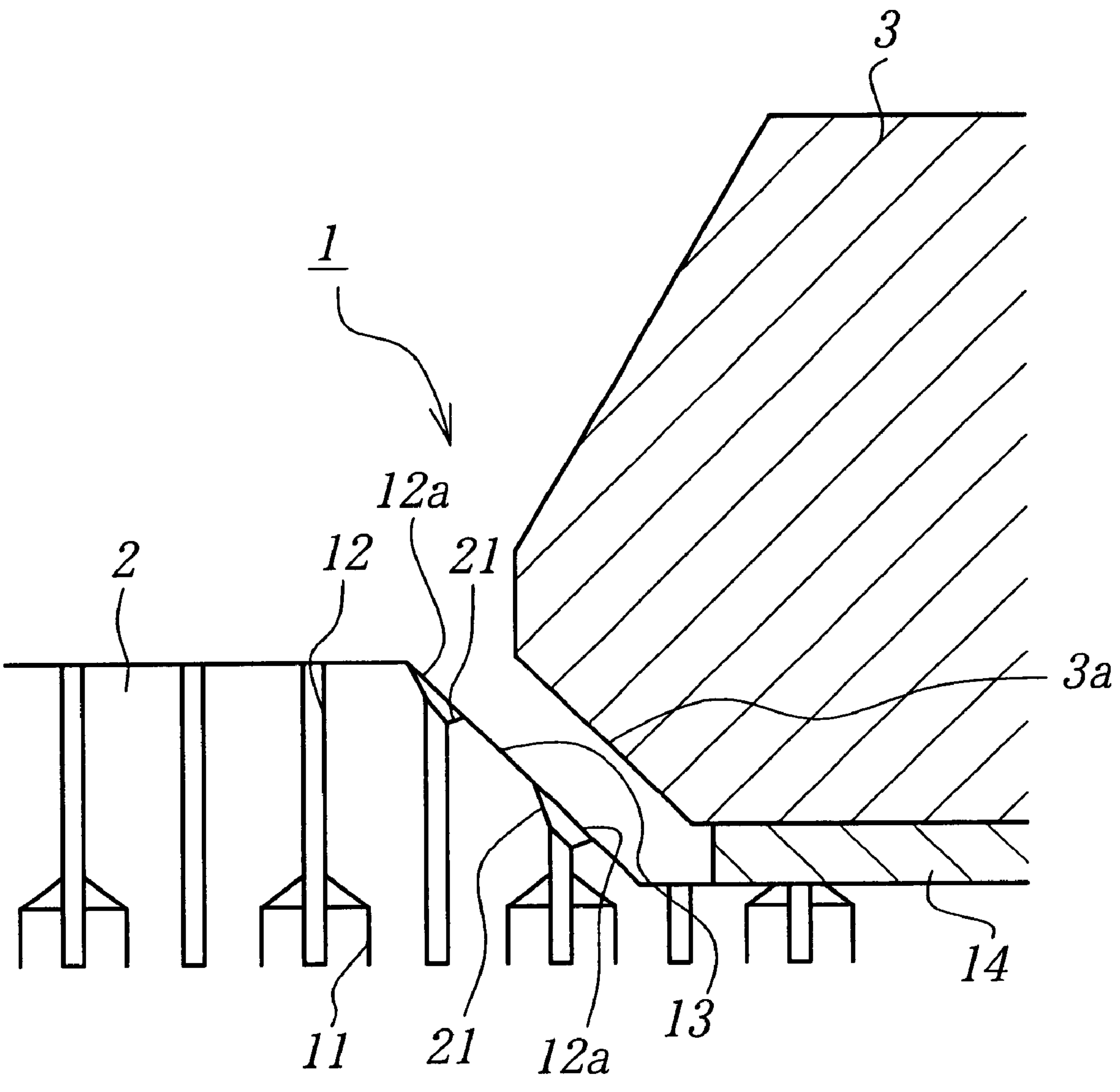
FIG. 1 is a schematic view showing one embodiment of a die for manufacturing honeycomb bodies according to the invention.

FIG. 1 is a schematic view showing one embodiment of a die for manufacturing honeycomb bodies according to the presently claimed invention. In the embodiment shown in FIG. 1, a die 1 for manufacturing honeycomb bodies features a die main body 2 and a control plate 3. The die main body 2 has a disk-shape and has batch supply holes 11 opening to its backside surface (lower surface (not shown) in FIG. 1) and slit channels 12 opening to its foreside surface (upper surface in FIG. 1). The slit channels 12 have a crisscross shape at the foreside surface of the die main body 2, and the batch supply holes 11 communicate with alternate intersection points. An outer peripheral portion of the die main body 2 is worked into a taper shape forming a chamfered conical-like surface or taper worked portion 13. The control plate 3 is connected to the die main body 2 via a spacer 14 in such a manner that one surface 3*a* is opposed (parallel in FIG. 1) to the taper worked portion 13.

The construction of the die 1 for manufacturing honeycomb bodies according to the invention mentioned above is the same as that of the known die for manufacturing honeycomb bodies. One difference between the die 1 of the presently claimed invention and the known die is that the slit channel expanding portions of the presently claimed invention are formed at open ends of the slit channels 12 in the taper worked portion 13 of the outer peripheral portion of the die main body 2. In the slit channel expanding portion 21, the slit channel 12 gradually expands toward an open end 12*a*. In this embodiment, the slit channel expanding portion 21 is formed by performing a C-chamfer working for the open end 12*a* of the slit channel 12. The C-chamfer working can be performed by grinding the slit channel 12 by means of a whetstone which is set at a predetermined angle with respect to the open end 12*a* of the slit channel. Moreover, the slit channel expanding portion 21 is formed locally a constant distance from the open end 12*a* of the slit channel 12.

Figure 2A:
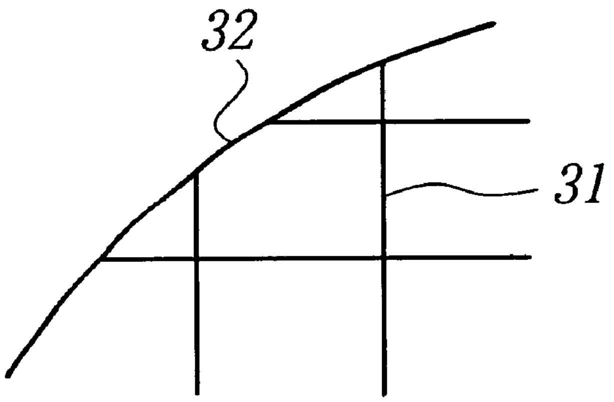
FIGS. 2*a* and 2*b* are schematic views respectively illustrating a part of honeycomb structural bodies according to a comparative example and an example of the present invention.
Figure 2B:
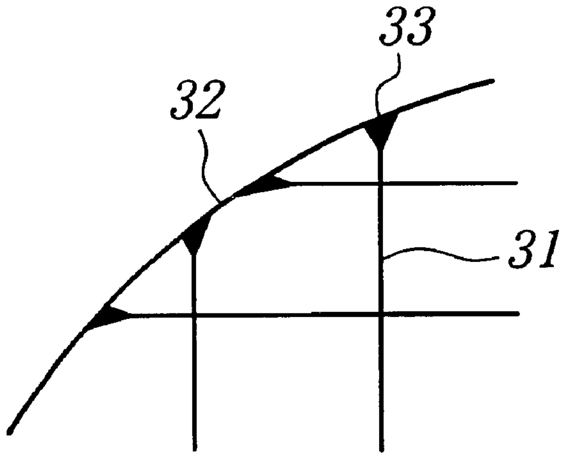

In the die 1 for manufacturing honeycomb bodies according to the invention mentioned above, because the slit channel expanding portions 21 are arranged at a predetermined position, a larger amount of batch can be extruded from the slit channels 12, in which the slit channel expanding portions 21 are arranged, compared to the slit channels 12 having no slit channel expanding portions 21. The batch extruded from the slit channel expanding portions 21, whose amount is larger than that of the other portion, contacts the control plate 3 and then integrates inwardly. As a result, after forming the honeycomb structural body after forming, it is possible to strengthen the ribs existing the outer peripheral portion thereof. One example is shown in FIGS. 2*a* and 2*b*. FIG. 2*a* shows a part of the honeycomb structural body extruded by using the known die for manufacturing honeycomb bodies. FIG. 2*b* illustrates a part of the honeycomb structural body extruded by using the die 1 for manufacturing honeycomb bodies according to the invention. The following is understood from a comparison between FIG. 2*a* and FIG. 2*b*. In the honeycomb structural body extruded by using the die 1 for manufacturing honeycomb bodies according to the invention, reinforced portions 33 are formed at connecting portions between ribs 31 and an outer wall 32 and thus improving isostatic strength of the honeycomb structural body. As a result, in the honeycomb structural body extruded by using the die 1 for manufacturing honeycomb bodies according to the invention, no wrinkle portions are generated at the outer portion.

In the embodiment mentioned above, the slit channel expanding portions 21 is formed by performing a C-chamfer working for the open end 12*a* of the slit channel 12. This C-chamfer working easily forms the slit channel expanding portions 21. However, the present invention is not limited to the C-chamfer working and it is possible to use another working methods to expand the slit channel 12 as mentioned above. Moreover, materials of the die main body 2, the control plate 3 and the spacer 14 are not explained, but it is a matter of course that the same materials used in the known die such as stainless steel can be used.

Hereinafter, an actual experiment will be explained.

Figure 3A:
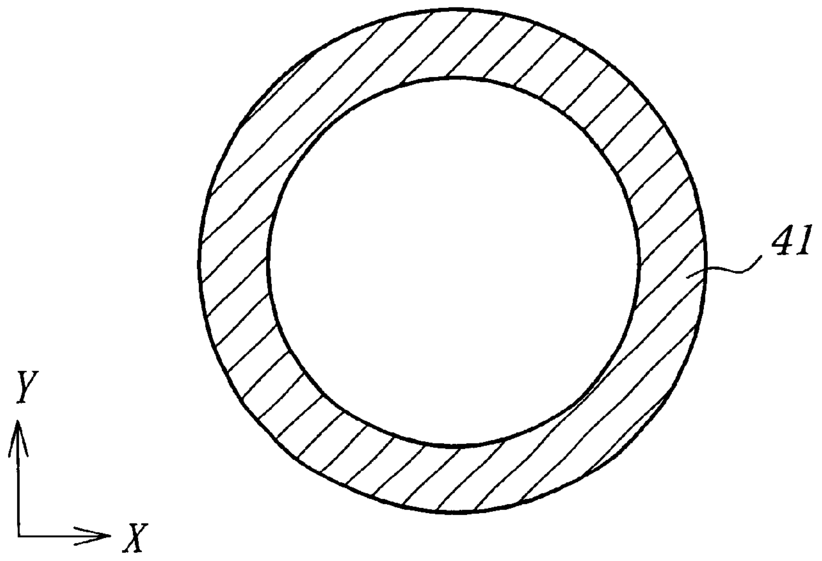
FIGS. 3*a* and 3*b* are schematic views respectively depicting one embodiment of the die according to the invention which is used in an experiment.
Figure 3B:
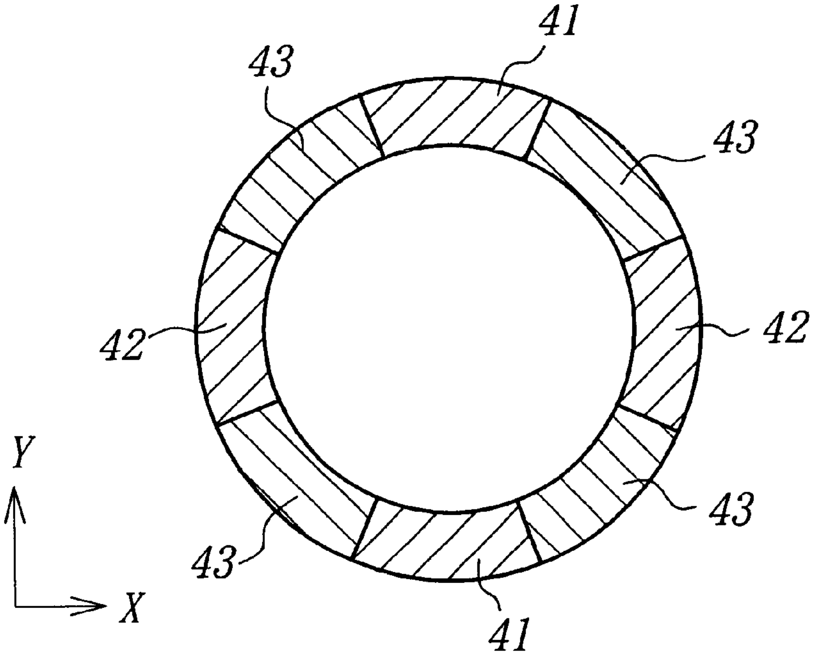
Figure 4:
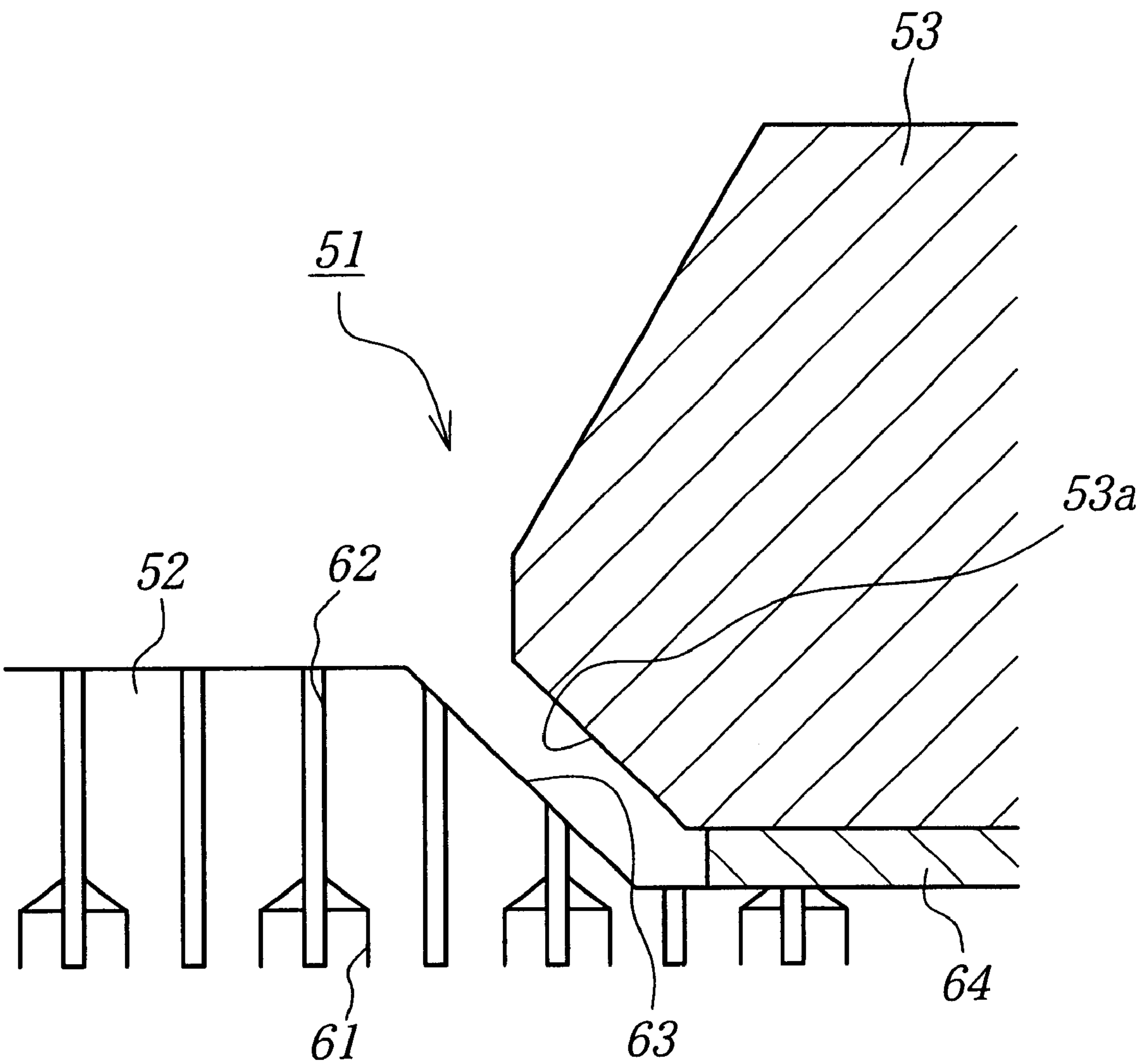
FIG. 4 PRIOR ART
FIG. 4 is a schematic view showing one embodiment of a known die for manufacturing honeycomb bodies.

Actually, ceramic honeycomb structural bodies, made of cordierite as a main ingredient, having a dimension of diameter: 103 mm, length: 100 mm, wall thickness: 3 mil, cell number: 400 cpsi were extruded by using dies according to a comparative example and examples 1–2 to form ceramic honeycomb structural bodies. Then, with respect to the thus formed ceramic honeycomb structural bodies, ISO (isostatic) strengths in a radial direction were measured and compared. Here, as a comparative example, use was made of a die in which no C-chamfer working was performed with respect to all the open ends of the slit channels existing in the taper worked portion. As an example 1, use was made of a die in which a C-chamfer working was performed with respect to all the open ends of the slit channels existing in the taper worked portion. That is to say, all the open ends of the slit channels existing in a diagonal line region 41 shown in FIG. 3*a*, i.e. the open ends of the slit channels along both X axis and Y axis if X axis and Y axis were assumed to be extended along crisscross slit channels, were worked by a C(0.5)-chamfer working. As an example 2, use was made of a die in which a C-chamfer working was performed with respect to only some of the open ends of the slit channels existing in the taper worked portion. That is to say, a C(0.5)-chamfer working was performed only for the open ends of the slit channels along Y axis existing in a diagonal line region 42 in FIG. 3*b*, only for the open ends of the slit channels along X axis existing in a diagonal line region 43 in FIG. 3*b* and for all the open ends of the slit channels along both X axis and Y axis existing in a diagonal line region 41 in FIG. 3*b*. The results are shown in the following Table 1. From the results show in Table 1, it is understood that the examples 1 and 2 according to the invention show better ISO strength as compared with the comparative example.

TABLE 1

| | Comparative example 1 | Example 1 | Example 2 |
|---|---|---|---|
| ISO strength | 10 $kg/cm^2$ level | more than 10 $kg/cm^2$ | more than 10 $kg/cm^2$ |

As is clearly understood from the explanations mentioned above, according to the invention, since the slit channel expanding portions having the construction mentioned above are arranged at a predetermined portion of the slit channels existing in the taper worked portion of the outer peripheral portions, a larger amount of batch can be supplied to the slit channel expanding portions as compared with that of the other portion, and thus the outermost ribs of the honeycomb structural body can be strengthened. Therefore, an isostatic strength of the honeycomb structural body can be improved even if the honeycomb structural body has a thin wall, and it is possible to prevent a generation of wrinkle portions at the outer portion.

What is claimed is:

1. A die for manufacturing honeycomb bodies, comprising:

a die main body comprising batch supply holes opening through a backside surface of the die, slit channels communicating with the batch supply holes, the slit channels opening through a foreside surface of the die, and a chamfered cone-like surface extending from an outer peripheral portion of the foreside surface toward peripheral sides of the die, the slit channels extending through the chamfered cone-like surface and having channel expanding exit portions gradually expanding the slit channels toward open ends extending through the chamfered cone-like surface; and a control plate having a surface complementary to and spaced adjacent said chamfered cone-like surface.

2. The die of claim 1, wherein said channel expanding exit portions have cross-sections which have a C-chamfer profile.

3. The die of claim 2, wherein the slit channels criss-cross in two perpendicular X and Y directions.

4. The die of claim 3, wherein the slit channels extending in both the X and Y direction have channel expanding exit portions on the chamfered cone-like surface of the die.

5. The die of claim 3, wherein the chamfered cone-like surfaces are divided into radial sections having channel expanding exit portions, each section selected from the group consisting of:

sections having channel expanding portions for the open ends of the slit channels extending in both the X and Y directions, sections having channel expanding portions for the open ends of the slit channels extending only in the Y direction, and sections having channel expanding portions for the open ends of the slit channels extending only in the X direction.

* * * * *